(12) United States Patent
Huang et al.

(10) Patent No.: US 10,695,153 B2
(45) Date of Patent: Jun. 30, 2020

(54) ELECTRIC TOOTHBRUSH AND MOTOR DEVICE THEREOF

(71) Applicant: JINLONG MACHINERY & ELECTRONICS (DONGGUAN) CO., LTD., Dongguan, Guangdong (CN)

(72) Inventors: Andian Huang, Guangdong (CN); Junjie Huang, Guangdong (CN); Min Deng, Guangdong (CN); Zhu Wang, Guangdong (CN); Yong Yue, Guangdong (CN)

(73) Assignee: JINLONG MACHINERY & ELECTRONICS (DONGGUAN) CO., LTD., Dongguan, Guaongdong (CN)

( * ) Notice: Subject to any disclaimer, the term of this patent is extended or adjusted under 35 U.S.C. 154(b) by 436 days.

(21) Appl. No.: 15/730,731

(22) Filed: Oct. 12, 2017

(65) Prior Publication Data

US 2018/0263743 A1 Sep. 20, 2018

(30) Foreign Application Priority Data

Mar. 20, 2017 (CN) .......................... 2017 1 0165611
Mar. 20, 2017 (CN) ..................... 2017 2 0272757 U

(51) Int. Cl.
*A61C 17/34* (2006.01)
*H02K 19/10* (2006.01)
(Continued)

(52) U.S. Cl.
CPC ............... *A61C 17/34* (2013.01); *H02K 1/30* (2013.01); *H02K 19/06* (2013.01); *H02K 19/103* (2013.01);
(Continued)

(58) Field of Classification Search
CPC ............ H02K 1/30; H02K 19/06; H02K 1/12; H02K 1/246; H02K 19/103; H02K 7/145; A61C 17/34
See application file for complete search history.

(56) References Cited

U.S. PATENT DOCUMENTS 5,111,096 A 5/1992 Horst
5,613,259 A * 3/1997 Craft .................. A61C 17/3481
15/22.1
(Continued)

FOREIGN PATENT DOCUMENTS

CN 205178807 U 4/2016
DE 102016108841 A1 11/2016
(Continued)

OTHER PUBLICATIONS

The European Search Report dated Apr. 13, 2018 for EP17275162.0.

*Primary Examiner* — Emily P Pham
(74) *Attorney, Agent, or Firm* — Yue (Robert) Xu; Apex Attorneys at Law, LLP

(57) ABSTRACT

A motor device includes a motor housing, a stator core having at least two poles fixedly installed in the stator housing symmetrically, a coil winding wound around the stator core, and an insulating coil holder for insulating the stator core from the coil winding, and the motor device further includes at least two pairs of magnetic steel structures cooperating with the stator core. All of the magnetic steel structures are fixedly connected to the periphery of the shaft coupling, and the shaft coupling is fixedly connected to the motor shaft. An electric toothbrush having the above motor device is further provided.

13 Claims, 2 Drawing Sheets

(51) Int. Cl.
*H02K 1/30* (2006.01)
*H02K 19/06* (2006.01)
*H02K 7/14* (2006.01)
*H02K 1/12* (2006.01)
*H02K 1/24* (2006.01)

(52) U.S. Cl.
CPC .............. *H02K 1/12* (2013.01); *H02K 1/246* (2013.01); *H02K 7/145* (2013.01)

(56) References Cited

U.S. PATENT DOCUMENTS

| | | | |
|---|---|---|---|
| 5,852,334 | A | 12/1998 | Pengov |
| 6,051,903 | A | 4/2000 | Pengov |
| 6,060,809 | A | 5/2000 | Pengov |
| 7,732,952 | B1 * | 6/2010 | Taylor .................... A61C 17/20 15/22.1 |
| 9,757,220 | B2 | 9/2017 | Kleppen |
| 2006/0168745 | A1 * | 8/2006 | Kobayashi ......... A61C 17/3445 15/22.1 |
| 2008/0209650 | A1 * | 9/2008 | Brewer .............. A46B 15/0002 15/22.1 |
| 2009/0273244 | A1 * | 11/2009 | Luo ........................ A46B 9/028 310/38 |
| 2016/0336838 | A1 | 11/2016 | Kouda et al. |

FOREIGN PATENT DOCUMENTS

| | | |
|---|---|---|
| EP | 0504093 A1 | 9/1992 |
| WO | 2015159215 A1 | 10/2015 |

\* cited by examiner

ELECTRIC TOOTHBRUSH AND MOTOR DEVICE THEREOF

CROSS-REFERENCE TO RELATED APPLICATIONS

This application claims the benefit of priorities to Chinese Patent Application No. 201710165611.5 and No. 201720272757.5 both titled "ELECTRIC TOOTHBRUSH AND MOTOR DEVICE THEREOF" and filed with the Chinese State Intellectual Property Office on Mar. 20, 2017, the entire disclosure of which is incorporated herein by reference.

FIELD

The present application relates to the technical field of household goods, and more particularly to a motor device, and further relates to a toothbrush having the motor device.

BACKGROUND

With the continuous improvement of people's living standards, electric toothbrushes begin to appear in people's daily life, replacing traditional toothbrushes to achieve more ideal and more convenient tooth brushing effect.

An electric toothbrush is generally driven by a motor, to allow a brush head to vibrate to clean teeth. The motor of a conventional electric toothbrush is generally required to be installed with a spring or a torsion bar similar to a torsional spring, and this type of structure is easily damaged during use and difficult to repair, therefore, the service life of the motor is often dependent on how long this type of structure can be used. With the above structural design, the motor has a low carrying capacity and a low torque per unit volume, and the range of oscillation of a motor shaft subjecting to different loads varies greatly, hence the application effect is not stable enough.

Therefore, an urgent technical issue to be addressed by the person skilled in the art at present is to effectively solve the problems of the electric toothbrushes such as the motor has a low carrying capacity and a short service life.

SUMMARY

In view of this, a first object of the present application is to provide a motor device, the structural design of the motor device can effectively solve the problems of the electric toothbrushes such as the motor has a low carrying capacity and a short service life, and a second object of the present application is to provide an electric toothbrush having the motor device.

To realize the first object, the following technical solutions are provided according to the present application.

A motor device includes a motor housing, a stator core having at least two poles fixedly installed in the stator housing symmetrically, a coil winding wound around the stator core, and an insulating coil holder for insulating the stator core from the coil winding, the motor device further includes at least two pairs of magnetic steel structures cooperating with the stator core, the magnetic steel structures are all fixedly connected to a periphery of a shaft coupling, and the shaft coupling is fixedly connected to a motor shaft.

Preferably, in the motor device, a plastic cement end cap is fixedly connected to an end, opposite to the motor shaft, of the motor housing, and an outer contour of the plastic cement end cap matches with an inner contour of the motor housing.

Preferably, in the motor device, a pair of ball bearings is connected between the motor shaft and the motor housing, and the insulating coil holder has an annular structure configured to support the ball bearings.

Preferably, in the motor device, two pairs of the magnetic steel structures are fixedly connected to the shaft coupling, included angles between the adjacent magnetic steel structures with respect to the shaft coupling have preset angle values, and at least two of the preset angle values are different.

Preferably, in the motor device, two pairs of the magnetic steel structures are fixedly connected to the shaft coupling, and a specification of at least one of the magnetic steel structures is different from specifications of the other magnetic steel structures.

Preferably, in the motor device, the motor shaft includes three sections of stepped structures, and the stepped structures are fixedly connected end to end.

The motor device according to the present application includes a motor housing and a stator core having at least two poles fixedly installed in the stator housing symmetrically, a coil winding wound around the stator core, and an insulating coil holder for insulating the stator core from the coil winding. The motor device further includes at least two pairs of magnetic steel structures for cooperating with the stator core, the magnetic steel structures are all fixedly connected to a periphery of a shaft coupling, and the shaft coupling is fixedly connected to a motor shaft.

When the motor device according to the embodiment is applied, the coil winding is electrified to generate a magnetic field at the stator core, the magnetic field drives the magnetic steel structures to drive the shaft coupling to rotate, and in turn the motor shaft is driven to move. By adopting the above structural design, the movement transmission is realized by the electromagnetic effect, and elastic structures such as a torsion bar is no longer needed. Thus, on the one hand, the problem that the service life of the motor is short because the elastic structure is easily damaged during use is avoided, and on the other hand, the motor can have a greater torque per unit volume, which, on the premise of reaching the rated torque, reduces the size of the motor as much as possible and reduces the weight of the electric toothbrush as much as possible, thereby improving the user experience.

In addition, the motor device according to the above embodiment transmits power via the electromagnetic structure, hence the power transmission process is more stable, and the range of oscillation of the motor shaft subjecting to different loads will not vary greatly, which facilitates the user to use the electric toothbrush.

In order to obtain the second object, an electric toothbrush is provided according to the present application, and the electric toothbrush includes any one of the above motor devices. Since the motor device has the above-described technical effects, the electric toothbrush having the motor device should also have corresponding technical effects.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only several examples of the present appli

REFERENCE NUMERALS IN THE FIGURES

| 1 | motor housing, | 2 | stator core, |
|---|---|---|---|
| 3 | coil winding, | 4 | insulating coil holder, |
| 5 | magnetic steel structure, | 6 | shaft coupling, |
| 7 | motor shaft, | 8 | plastic cement end cap, |
| 9 | ball bearing. | | |

DETAILED DESCRIPTION

An electric toothbrush and a motor device thereof are provided according to embodiments of the present application, to avoid the motor device of the electric toothbrush from having a too short service life, and to improve stability and carrying capacity of the motor device during use.

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any efforts, fall into the scope of protection of the present application.

Figure 1:
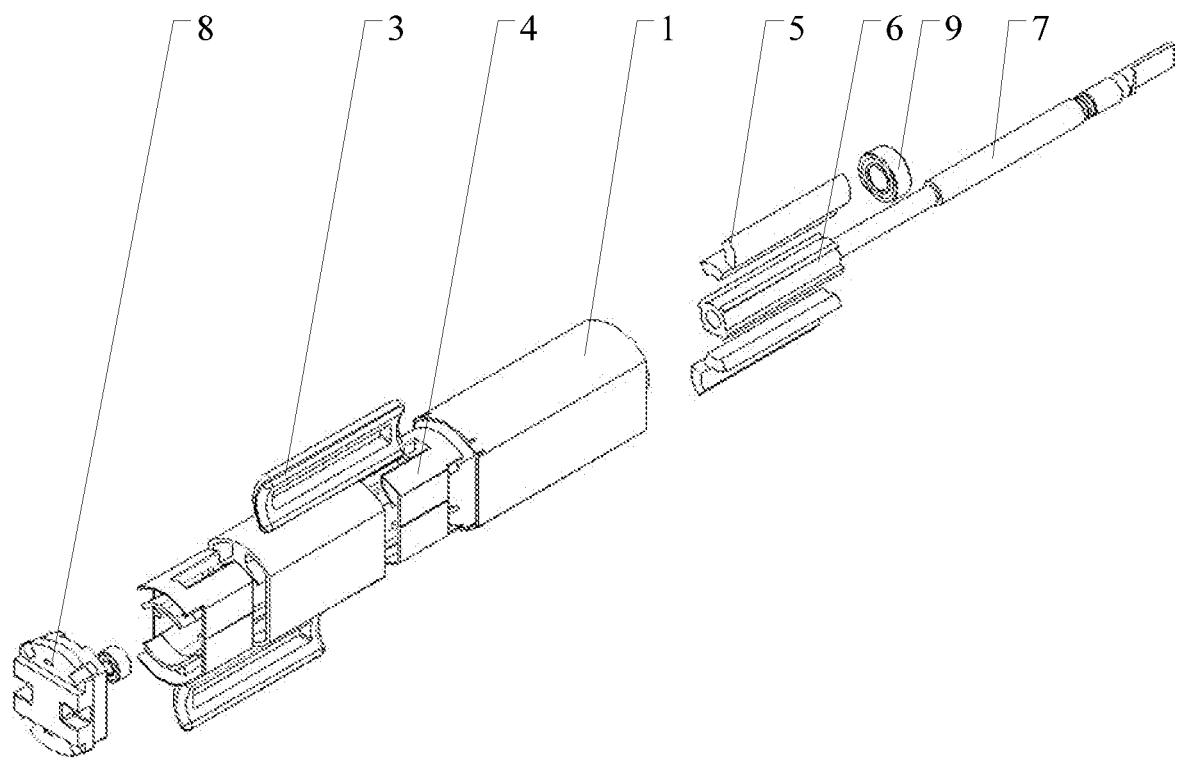
- FIG. 1 is an assembly exploded view showing a motor device according to an embodiment of the present application.
Figure 2:
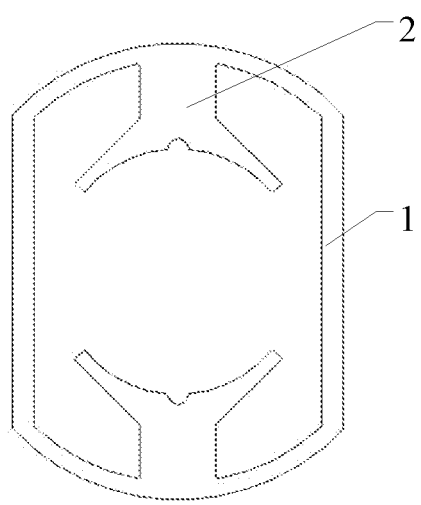
FIG. 2 is a schematic side view showing the structure of a motor housing according to an embodiment of the present application.
Figure 3:
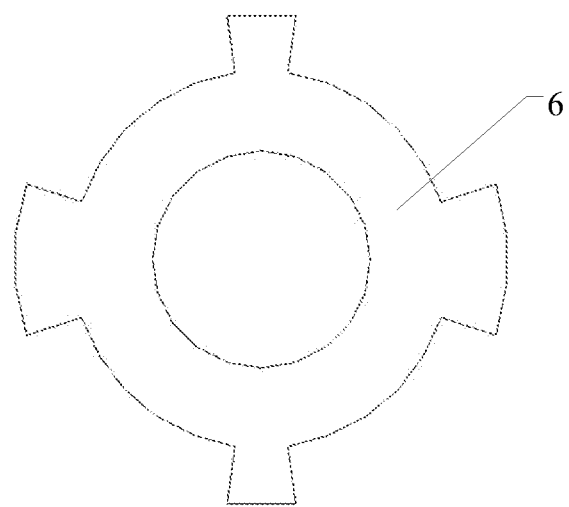
FIG. 3 is a schematic side view showing the structure of a shaft coupling according to an embodiment of the present application.
Figure 4:
FIG. 4 is a schematic left view showing the structure of a motor shaft according to an embodiment of the present application.

Reference is made to FIGS. 1 to 4, FIG. 1 is an assembly exploded view showing a motor device according to an embodiment of the present application; FIG. 2 is a schematic side view showing the structure of a motor housing according to an embodiment of the present application; FIG. 3 is a schematic side view showing the structure of a shaft coupling according to an embodiment of the present application; FIG. 4 is a schematic left view showing the structure of a motor shaft according to an embodiment of the present application.

A motor device is provided according to an embodiment of the present application, and includes a motor housing 1, a stator core 2 having at least two poles fixedly installed in the stator housing 1 symmetrically, a coil winding 3 wound around the stator core 2, and an insulating coil holder 4 for insulating the stator core 2 from the coil winding 3. The motor device further includes at least two pairs of magnetic steel structures 5 cooperating with the stator core 2, the magnetic steel structures 5 are all fixedly connected to a periphery of a shaft coupling 6, and the shaft coupling 6 is fixedly connected to a motor shaft 7.

When the motor device according to the embodiment is applied, the coil winding 3 is electrified to generate a magnetic field at the stator core 2, the magnetic field drives the magnetic steel structures 5 to drive the shaft coupling 6 to rotate, and in turn the motor shaft 7 is driven to move. By adopting the above structural design, the movement transmission is realized by the electromagnetic effect, and elastic structures such as a torsion bar is no longer needed. Thus, on the one hand, the problem that the service life of the motor is short because the elastic structure is easily damaged during use is avoided, and on the other hand, the motor can have a greater torque per unit volume, which, on the premise of reaching the rated torque, reduces the size of the motor as much as possible and reduces the weight of the electric toothbrush as much as possible, thereby improving the user experience.

In addition, the motor device according to the above embodiment transmits power via the electromagnetic structure, hence the power transmission process is more stable, and the range of oscillation of the motor shaft 7 subjecting to different loads will not vary greatly, which facilitates the user to use the electric toothbrush.

In order to optimize the use effect of the motor housing 1 in the embodiment, a plastic cement end cap 8 is fixedly connected to one end, opposite to the motor shaft 7, of the motor housing 1, and the outer contour of the plastic cement end cap 8 matches with the inner contour of the motor housing 1. Preferably, one end of the motor housing 1 is closed by the plastic cement end cap 8, which, on the one hand, provides a support position for the internal structures and facilitates the internal structures to be installed compactly and to cooperate with each other stably, and on the other hand, can also protect the internal structures from pollution and influence in the external environment as much as possible, to ensure sustained and stable internal power transmission.

In order to optimize the use effect of the motor shaft 7 in the embodiment, a pair of ball bearings 9 is connected between the motor shaft 7 and the motor housing 1, and the insulating coil holder 4 has an annular structure for supporting the ball bearings 9. Preferably, the motor shaft 7 is connected to the ball bearings 9, which makes the rotation of the motor shaft 7 smoother, thus avoiding the wear of the motor shaft 7 and stabilizing the position of the motor shaft 7. Preferably, the ball bearings 9 are supported by the annular structure on the insulating coil holder 4. The pair of ball bearings 9 allows a front end and a rear end of the motor shaft 7 to be subjected to forces uniformly, and thus the motor shaft 7 can be installed steadily.

It is worth mentioning that, the insulating coil holder 4 may adopt split type design, a pair of insulating coil holders 4 are respectively inserted into the motor housing 1 from two ends of the motor housing 1, the annular structures may also be provided separately, and each of the insulating coil holders 4 is provided with one annular structure, thus avoids interference between each other and facilitates installation and maintenance.

In order to optimize the use effect of the magnetic steel structures 5 in the embodiment, two pairs of magnetic steel structures 5 are fixedly connected to the shaft coupling 6, an included angle between the each two adjacent magnetic steel structures 5 with respect to the shaft coupling 6 has a preset angle value, and at least two preset angle values are different from each other. Preferably, the magnetic steel structures 5 are unevenly distributed on the periphery of the shaft coupling 6, which allows the motor shaft 7 to vibrate during the rotation process of the magnetic steel structures 5, thereby optimizing the vibration effect of the motor shaft 7 during use, and enhancing the cleaning ability of the electric toothbrush. Apparently, the values of the included angles between the adjacent magnetic steel structures 5 with respect to the shaft coupling 6 may be differ from one another and randomly set, or just two included angles have different values, and specific choices can be made flexibly according to the actual requirements.

In another specific embodiment of the present application, two pairs of magnetic steel structures 5 are fixedly connected to the shaft coupling 6, and the specification of at least one magnetic steel structure 5 is different from the specifications of the other magnetic steel structures 5. Preferably, the magnetic steel structures 5 have different specifications, which is equivalent to the magnetic steel structures 5 having same specifications being installed at different angles, and in this case, the effect of the uneven distribution of the magnetic steel structure 5 on the periphery of the shaft coupling 6 can also be realized, and the same technical effect described above can also be obtained, which will not be described herein.

In order to optimize the use effect of the motor shaft 7 in the embodiment, the motor shaft 7 includes three sections of stepped structures, and the stepped structures are fixedly connected end to end. Preferably, the motor shaft 7 includes the three sections of stepped structures, which makes the assembling of the motor shaft 7 more convenient and the matching degree between the shape of the motor shaft 7 and other structures better, and more efficiently saves the space. Also, the stepped structures facilitate the machining of the motor shaft 7, and reduces the overall manufacturing difficulty of the motor shaft 7.

Based on the motor device according to the above embodiments, an electric toothbrush is provided according to the present application. The electric toothbrush includes any one of the motor devices in the above embodiments. Since the electric toothbrush employs the motor devices in the above embodiments, the beneficial effects of the electric toothbrush may refer to the above embodiments.

The above embodiments are described in a progressive manner. Each of the embodiments is mainly focused on describing its differences from other embodiments, and references may be made among these embodiments with respect to the same or similar portions among these embodiments.

It should be noted that, in this specification, terms "include", "comprise" or any other variations are intended to cover non-exclusive "include", thus a process, a method, an object or a device including a series of factors not only include the listed factors, but also include other factors not explicitly listed, or also include inherent factors of the process, the method, the object or the device. Without more limitations, a factor defined by a sentence "include one . . . " does not exclude a case that there is another same factor in the process, the method, the object or the device including the described factor.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. A motor device, comprising a motor housing, a stator core having at least two poles fixedly installed in the motor housing symmetrically, a coil winding wound around the stator core, and an insulating coil holder for insulating the stator core from the coil winding, wherein, the motor device further comprises at least two pairs of magnetic steel structures cooperating with the stator core, the at least two pairs of magnetic steel structures are all fixedly connected to a periphery of a shaft coupling, and the shaft coupling is fixedly connected to a motor shaft; and wherein a pair of ball bearings is connected between the motor shaft and the motor housing, and the insulating coil holder has an annular structure configured to support the pair of ball bearings.

2. The motor device according to claim 1, wherein a plastic cement end cap is fixedly connected to an end, opposite to the motor shaft, of the motor housing, and an outer contour of the plastic cement end cap matches with an inner contour of the motor housing.

3. The motor device according to claim 1, wherein included angles between adjacent magnetic steel structures in the at least two pairs of magnetic steel structures with respect to the shaft coupling have preset angle values, and at least two of the preset angle values are different.

4. The motor device according to claim 1, wherein a specification of at least one magnetic steel structure of the at least two pairs of magnetic steel structures is different from specifications of the other magnetic steel structures of the at least two pairs of magnetic steel structures.

5. The motor device according to claim 3, wherein the motor shaft includes three sections of stepped structures, and the three sections of stepped structures are fixedly connected end to end.

6. The motor device according to claim 2, wherein included angles between adjacent magnetic steel structures in the at least two pairs of magnetic steel structures with respect to the shaft coupling have preset angle values, and at least two of the preset angle values are different.

7. The motor device according to claim 2, wherein a specification of at least one magnetic steel structure of the at least two pairs of magnetic steel structures is different from specifications of the other magnetic steel structures of the at least two pairs of magnetic steel structures.

8. The motor device according to claim 7, wherein the motor shaft includes three sections of stepped structures, and the three sections of stepped structures are fixedly connected end to end.

9. An electric toothbrush, comprising the motor device according to claim 1.

10. The electric toothbrush according to claim 9, wherein a plastic cement end cap is fixedly connected to an end, opposite to the motor shaft, of the motor housing, and an outer contour of the plastic cement end cap matches with an inner contour of the motor housing.

11. The electric toothbrush according to claim 9, wherein included angles between adjacent magnetic steel structures in the at least two pairs of magnetic steel structures with respect to the shaft coupling have preset angle values, and at least two of the preset angle values are different.

12. The electric toothbrush according to claim 9, wherein and a specification of at least one magnetic steel structure of the at least two pairs of magnetic steel structures is different from specifications of the other magnetic steel structures of the at least two pairs of magnetic steel structures.

13. The electric toothbrush according to claim 12, wherein the motor shaft includes three sections of stepped structures, and the three sections of stepped structures are fixedly connected end to end.

* * * * *